United States Patent [19]

Hirata et al.

[11] Patent Number: 5,106,889
[45] Date of Patent: Apr. 21, 1992

[54] DISPERSION OF COLORED HIGH-MOLECULAR PARTICULATE MATERIAL

[75] Inventors: Tadamitsu Hirata, Hirakata; Yoshihiko Nishimura, Toyonaka, both of Japan

[73] Assignee: Asahipen Corporation, Osaka, Japan

[21] Appl. No.: 569,256

[22] Filed: Aug. 16, 1990

Related U.S. Application Data

[63] Continuation of Ser. No. 383,513, Jul. 24, 1989, abandoned.

[51] Int. Cl.$^5$ .................................................. C08K 3/30
[52] U.S. Cl. .................................... 524/423; 524/434; 524/436; 524/437; 524/469; 524/569; 524/501; 524/556
[58] Field of Search ............... 524/423, 436, 469, 501

[56] References Cited

U.S. PATENT DOCUMENTS 4,040,997 8/1977 Van Vonno et al. ............... 524/425
4,460,732 7/1984 Buscall ............................... 524/556

FOREIGN PATENT DOCUMENTS 2927005 1/1981 Fed. Rep. of Germany ...... 524/569
51-10251 4/1976 Japan .
51-34880 9/1976 Japan .
55-45779 3/1980 Japan ................................. 524/569

*Primary Examiner*—Joseph L. Schofer
*Assistant Examiner*—Mark Sweet
*Attorney, Agent, or Firm*—Armstrong, Nikaido, Marmelstein, Kubovcik & Murray

[57] ABSTRACT

A dispersion of a colored high-molecular weight particulate material is prepared by a) mixing a pigment with an aqueous emulsion of a resin to form a dispersion of the pigment within the emulsion; b) combining the dispersion with particles of polyvinyl chloride containing a plasticizer to form a mixture; and c) adding a metal salt to the mixture to cause the resin to coagulate onto the particles of the polyvinyl chloride. A film comprising the resin and the pigment is formed on the particles of the polyvinyl chloride.

2 Claims, 2 Drawing Sheets

DISPERSION OF COLORED HIGH-MOLECULAR PARTICULATE MATERIAL

This application is a continuation of application Ser. No. 383,513 filed Jul. 24, 1989, now abandoned.

INDUSTRIAL FIELD OF THE INVENTION

The present invention relates to a coloring high-molecular particulate material and coating composition therewith. The object of the invention is to provide a method of coloring high-molecular particulate material and coating composition therewith, enabling the coating film to have colorfully designed appearance of various sprinkled patterns of textiles and suede, a texture with smoothness and roughness at the same time as well as visual appreciation of tint configuration to wall papers, synthetic resin sheets or the like.

PRIOR ART AND PROBLEMS THEREOF

Heretofore, coating compositions have their colors by mixing coloring pigments of each color into a varnish.

However, the coloring pigments used for said coating compositions have particles up to 10 $\mu$ in particle diameter to obviate color shading, to enhance dispersion properties and to uniform color tone. In general coating compositions, the smaller particle diameter is, the more it is desirable. For example, when a red compound and a white compound were blended to prepare a sprinkled pattern, tiny dots of coloring pigment of different colors alined on the film surface of the coating composition were throughly mixed each other forming a plain color with no spattered pattern, i.e., it visually appears as a pink coating film, hence poor in decorative properties.

The present inventors conducted extensive research in the coating composition excellent in the decorative properties serving as colorful designs and found the following. The color particle in particle diameter of about 10 to about 200 $\mu$ are prepared, thereafter different color particle from said color particle are mixed into an aqueous varnish to prepare the coating composition wherein color particles alined on the coating surface thereof afford visually colorful design like seen in textiles or suede.

That is, large-size coloring pigments cannot be uniformly dispersed, so that resin particles are prepared first to form a coating film on the particle surface whereby the color particles can be dispersed in a varnish to prepare the coating composition.

Obtaining the color particles, the present inventors attempted pearl polymerization by introducing a monomer and coloring pigments into water. The polymerization, however, was inhibited by the coloring pigments or only the monomer is polymerized posing difficulties for polymerization with coating the coloring pigments.

Alternatively, the present inventors attempted emulsion polymerization by blending a monomer, an emulsifier and coloring pigments into water, interfacial polymerization by polymerizing at the interface between an oil phase and a water phase and offset separation by mixing poor solvent into good solvent dissolved coloring pigents and a polymer therein or like polymerization.

All of polymerization carried out above exhibit difficulties with adjusting particle diameter to result in a wide particle size distribution, non-uniform color shading on the pattern of the coating film as well as low yield of color particles.

Especially interfacial polymerization, the coating film was cured with fluid solvent remaining in the coloring particles to result in coring the interior with poor particle strength against scratches, etc.

The present inventors also developed coating composition for colorful design finish and its preparation method was disclosed in Japanese Unexamined Patent Publication No. 145378/1988. The method of preparing the above composition was developed to obtain the emulsion resin coating composition mixture including the dispersed and stabilized by anionic activate surface agent coloring pigment are admixed with polymer particles of diameter from 10 to 100 $\mu$, wherein metal salt is introduced to obtain coloring high-molecular particulate material having a color membrane.

This coating composition excellent in the decorative properties having tiny dots of its coloring pigments aligned on the coating surface to provide colorful effect available on textiles or suede as well as the fastness properties of a coating film with non-uniform color shading thereon.

Said method of preparing the coating composition is more outstanding than the conventional methods. However, it actually has a drawback of not coating completely an emulsion resin having coloring pigments on the particle surface of the syntheric resin.

MEANS FOR SOLVING THE PROBLEMS

According to the present invention, the afore-mentioned problems can be wholly solved by the presented coloring high-molecular particulate material characterized in that a mixture of dispersed and stabilized coloring pigments and an emulsion resin are admixed with the particles of vinyl chloride synthetic resin containing a plasticizer of about 4.7 to about 50 wt. %, wherein a metal salt is introduced to obtain coloring high-molecular particulate material of about 10 to about 200 $\mu$ in average particle diameter.

DETAILED DESCRIPTION OF THE INVENTION

Figure 1:
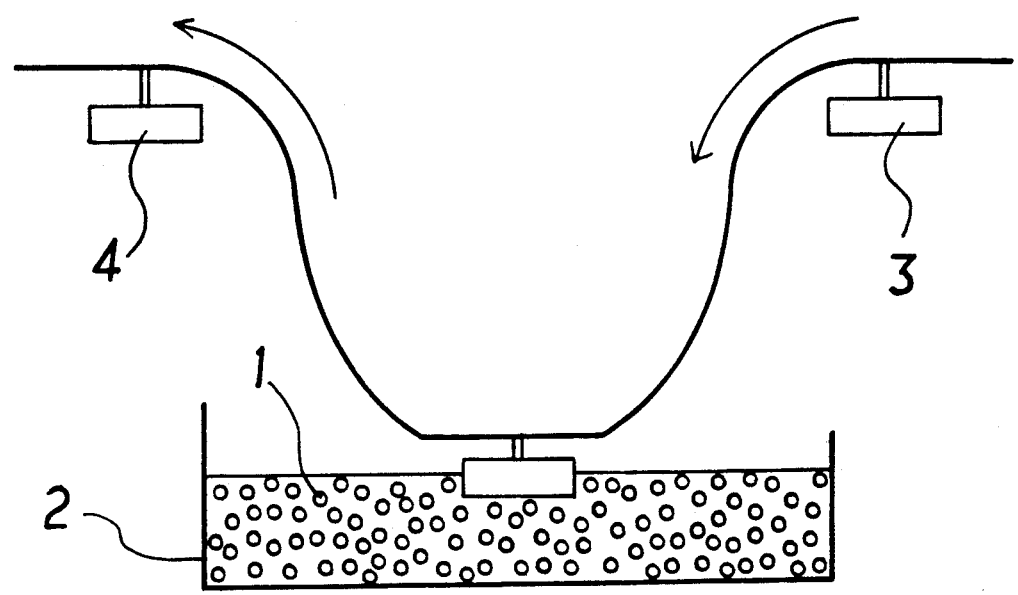
FIG. 1 is a schematic drawing illustrating the fluidization dip method as one of the fabrication methods with the use of the present coloring high-molecular particulate material.

Following is the first process of preparing coloring high-molecular particulate material that a mixture of dispersed and stabilized coloring pigments and an emulsion resin are admixed with the particles of a vinyl chloride synthetic resin containing a plasticizer of about 4.7 to about 50 wt. %, wherein a metal salt is introduced to obtain coloring high-molecular particulate material of 10 to 200 $\mu$ in particle diameter.

The emulsion resin to be favorably used for the present invention can be any of those inhibited emulsion stability in the presence of metal ions and agglomerates or adheres like gel to the particle surface of the vinyl chloride synthetic resin containing the plasticizer described later.

Examples of such emulsion resins are acryl, styrene acryl, polyester, polyurethane, vinyl chloride-vinyl acetate copolymer, vinyl chloride-acryl copolymer or like synthetic resins and mastic, acaroid, benzoyl, dragon's blood, elemi, sandrach or like natural resins.

Although the surfactants to be used for the invention are not limited specifically, positive ionics, negative ionics, nonionics or ampholytic surfactants are conveniently used. The desirable amount of such surfactants to be added to destabilize the emulsion for metal ions is up to about 1 wt. %, based on the loadings of the emulsion resin having particles not larger than about 0.1 $\mu$ in particle diameter although the amount is not specifically limited.

Antiforming agents, film forming assistants or the like may optionally be introdeced into the emulsion resin when required.

Examples of preferable coloring pigments are ones conventionally known such as titanium dioxide, amber, red iron oxide, chrome yellow, iron blue, carbon black, ultramarine blue, manganese violet or like inorganic pigments and Hansa yellow, benzidine yellow, toluidine red, phthalocyanine blue, phthalocyanine green, dioxazine violet or like organic pigments.

Further, the extender pigments such as barytes, calcium carbonate, clay, talc, etc. can be used in combination with the above coloring pigments.

The amount of the coloring pigments to be favorably used is, not particularly limited though, about 2 to about 300 parts by weight per 100 parts by weight of said emulsion resin solids.

Usable vinyl chloride synthetic resins are not specifically limited but ones formed by suspension or emulsion polymerization such as a vinyl chloride homopolymer, vinyl chloride-vinyl acetate copolymer, ethylene-vinyl chloride copolymer, ethylene-vinyl acetate-vinyl chloride copolymer, urethane-vinyl chloride copolymer, chlorinated vinyl chloride copolymer or the like.

It is desirable for the vinyl chloride synthetic resin to be selected from the obtained coloring high-molecular particulate material in average particle diameter of about 10 to about 200 $\mu$, slightly variable depending on the loading of the plasticizer though, more preferably about 10 to about 170 $\mu$.

The plasticizers to be mixed with the vinyl chloride syntheric resins above are not limited specifically but preferably di-2-etylhexyl phthalate, diheptyl phthalate, di-n-octyl phthalate, di-nonyl phtahlate, dibutyl phathalate, butyl benzyl phthalate, di-isodecyl phthalate, di-2-ehtylhexyl tetrahydrothatlic acid, di-2-ethyl-hexyladipate, di-isodecyl adipate, di-2-ethylhexyl sebacate, tricresyl phoshate, trioctyl phosphate, acetyl trilbutyl citrate, trioctyl trimellitate, tridecyl trimellitate, butyl phthalyl butyl glucolate, epoxy soybean oil, diallyl phthalate, polyethylene glycol dimetha acrylate or the like.

The amount of the plasticizers to be added is about 4.7 to about 50 wt. %, more preferably about 23 to about 44 wt. %, based on the weight of vinyl chloride synthetic resin after the plasticizer is added. Especially the vinyl chloride synthetic resins prepared by said suspension polymerization are suitably used in an amount of 33 to about 44 wt. %, and the resins prepared by said emulsion polymerization are suitably used in an amount of about 23 to about 38 wt. %.

The plasticizer of less than about 4.7 wt. % gives the emulsion resin containing coloring pigments low efficiency of coating to the particle surface of the vinyl chloride synthetic resin, whereas the plasticizer of exceeding about 50 wt. % results in insufficient coating film strength softening the particles of the resin, and the tack strength among the particles to exhibit difficulties with removing as an individual particle at the final stage.

The typical method of admixing the vinyl chloride synthetic resin and the plasticizer is to use a HENCEL MIXER agitator, wherein stabilizing or modifying agents for the resin are introduced when required.

The desirable amount of the emulsion resins to be used is about 0.05 to about 2.0, more preferably about 0.1 to about 1, when the amount to be used of the vinyl chloride synthetic resin including the plasticizer is 1 (part by weight).

The emulsion resin of less than about 0.05 cannot coat throughly the particles of the vinyl chloride synthetic resin giving particles low tinting, whereas the emulsion resin of exceeding 2.0 has its particles agglomerated like gel to result in the deteriorated particle strength.

A large amount of the vinyl chloride synthetic resin provides lower fluidity so that water may be added for good fluidity when required.

Usable metal salts are not limited particularly but favorably calcium chloride, barium chloride, aluminum sulfate, cuprous sulfate, ferric chloride, silver nitrate, lead acetate or the like.

The metal salt is used to inhibit stability of the emulsion resin containing coloring pigments and to coagulate the emulsion resin having pigments on the particle surface of the vinyl choloride synthetic resin.

The suitable amount of the metal salt to be added is conveniently determined by figuring out the amount wherein the emulsion resin and the metal salt blended agglomerated like gel.

Alternatively, water can be added to the metal salt forming aqueous solution of metal salt whereby the emulsion resin is admixed therewith.

The weight ratio of the aqueous solution of the emulsion containing coloring pigments; metal salt is about 7:3 to about 3:7, more preferably about 6:4 to about 5:5, taking particle stability into consideration, although it is not particularly limited.

It is possible to use a calcium hydroxide in stead of the metal salts.

According to the present invention, the emulsion resin having the above coloring pigments and the particles of the vinyl chloride synthetic resin having the plasticizer are mixed with stirring, thereafter the mixture is admixed with the metal salt to obtain dispersions of coloring high-molecular particulate material wherein the film of the emulsion coating composition of the synthetic resin is formed on the particle surface of the vinyl chloride synthetic resin.

Thus obtained coloring high-molecular particulate material is favorably about 10 to about 200 $\mu$m, more favorably about 30 to 100 $\mu$m, in average particle diameter.

The individual coloring high-molecular particulate material in particle diameter of up to about 10 $\mu$, when mixed with the particles of different color, can not be identified individually with unaided eye, that is, the particles of different colors all mixed together throughly can not be visually seen as a colorful pattern. On the other hand, the particle diameter of at least about 200 $\mu$ gives the particles the rough distribution of color without developing colorful effect of textiles or suede excellent in the descorative properties as well as the gritty ecture failing to provide smoothness.

The particle diameter of about 30 to about 100 μ affords the particles with a smooth touch exhibition outstanding textile—or suede—like texture.

From the above dispersions the coloring high-molecular particulate material and dispersion medium are separated off, then the former is further removed therefrom to obtain a molded form thereof the preparation method of fluidization dip or the like.

The fluidization dip method, as one of the preparation methods using the coloring high-molecular particulate material, will be described with reference to the accompanying drawings.

FIG. 1 is a schematic drawing illustrating the preparetion method.

In the drawings, (1) is coloring high-molecular particulate material, (2) is a container for (1) and (3) is a mold.

Put the coloring high-molecular particulate material (1) in the container (2), then dip the heated mold (3) therein.

A thin film is formed on the outer surface of the mold (3) by fusing the coloring high-molecular particulate material (1).

Consequently, remove the mold (2) from the container cooling off with the air or water to strip a molded form (4) from the mold (3).

Figure 2:
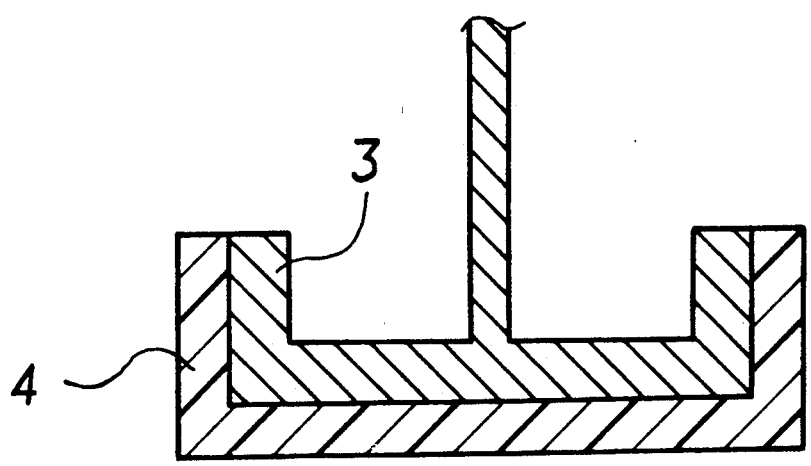
FIG. 2 is a longitudinal section illustrating the mold coated with the molded form of the coloring high-molecular particulate material.

FIG. 2 is a longitudinal section illustrating the mold (3) coated with the molded form (4) of the coloring high-molecular particulate material (1).

Another method of sprinkling the coloring high-molecular particulate material (1) on the surface of the heated mold (3) can be alternatively employed.

The shape of the mold (3) shown in the figures is not limited or the mold (3) without heating can be also used to form a thin film thereon by fusing the coloring high-molecular particulate material (1) in the container (2).

Figure 3:
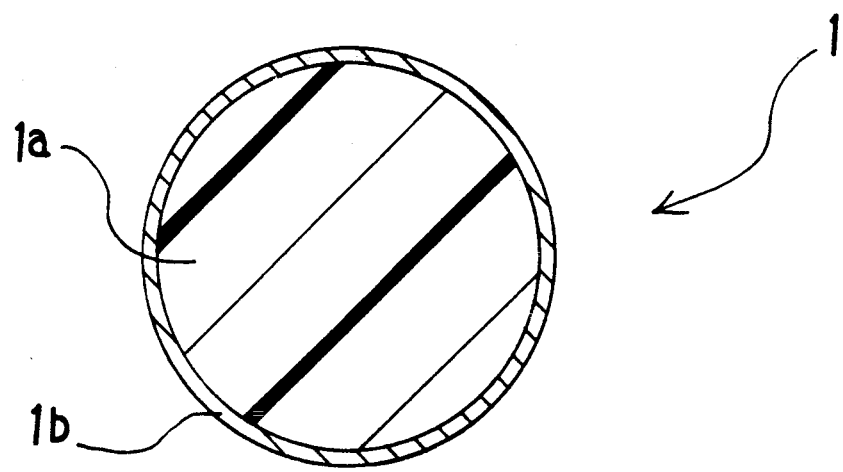
FIG. 3 is a sectional explanational view of the coloring high-molecular particulate material.

FIG. 3 is a sectional explanational view of the coloring high-molecular particulate material (1), (1a) indicates a polymer particulate and (1b) color membrane.

Second method of the coloring high-molecular particulate material is described hereinafter.

The second method is that a mixture being controlled not less than Acid value 5 in solid portion of dispersed and stabilized pigments and polycarboxylic acid resin neutralized by alkaline are admixed with the synthetic resin particles, wherein a metal salt is introduced to obtain coloring high-molecular particulate material of 10 to 200 μ in average particle diameter.

It is desirable for polycarboxylic acid resin to be selected from the group which consits of acryl resin, Styrene-butadiene resin, Styren-maleic acid copolymer, alkyd resin, alginic acid resin et al.

As for a neutralization agent in this present invention, there are ammonia water, triethylamine, dimethylethanolamine, potassium hydroxide, Natrium hydroxide et al.

Antiforming agents film forming assistants or the like may optionally be introduced into the mixture when required.

Examples of preferably coloring pigments are ones conventionally known such as titanium dioxide, amber, red iron oxide, chrome yellow, iron blue, carbon black, ultramarine blue, manganese violet or like inorganic pigments and Hansa yellow, benzidine yellow, toluidine red, phthalocyanine blue, phthalocyanine green, dioxazine violet or like organic pigments.

Further, the extender pigments such as barytes, calcium carbonate, clay, talc, etc. can be used in combination with the above coloring pigments.

The amount of the coloring pigments to be favorably used is, not particularly limited though, amount 2 to about 300 parts by weight per 100 parts by weight of said emulsion resin solids.

Usable synthetic resins particles are not specifically limited but ones formed by suspension or emulsion polymerization such as a vinyl chloride homopolymer, copolymer acryl polymer, polyester resin et al.

It is desirable for the syntheric resin particles to be selected from the obtained coloring high-molecular particulate material in average particle diameter of about 10 to about 200 μm slightly variable depending on the loading of the plasticizer though, more preferably about 10 to about 170 μm.

The desirable amount of the emulsion mixture to be used is about 0.05 to about 2.0, more preferably about 0.1 to about 1, when the amount to be used of the vinyl chloride synthetic resin including the plasticizer is 1 (part by weight).

The emulsion mixture of less than about 0.05 cannot coat throughly the particles of the vinyl chloride synthetic resin giving particles low tinting, whereas the emulsion resin of exceeding 2.0 has its particles agglomerated like gel to result in the deteriorated particle strength.

Usable metal salts are not limited particularly but favorably calcium chloride, barium chloride, aluminum sulfate, cuprous sulfate, ferric chloride, silver nitrate, lead acetate or the like.

The metal salt is used to inhibit stability of the polycarboxylic acid resin containing coloring pigments and to coagulate the polycarboxylic acid resin having pigments on the particle surface of the vinyl chloride synthetic resin.

The suitable amount of the metal salt to be added is conveniently determined by figuring out the amount wherein the emulsion resin and the metal salt blended agglomerated like gel.

Alternatively, water can be added to the metal salt forming aqueous solution of metal salt whereby the emulsion resin is admixed therewith. The weight ratio of the aqueous solution of the emulsion resin containing coloring pigments; metal salt is about 7:3 to about 3:7, more preferably about 6:4 to about 5:5, taking particle stability into consideration, although it is not particularly limited.

It is possible to use potassium hydroxide instead of metal salt.

According to the present invention, the mixture having the above coloring pigments and the particles of the synthetic resin are mixed with stirring, thereafter the mixture is admixed with the metal salt to obtain dispersions of coloring high-molecular particulate material wherein the film of the emulsion coating composition of the synthetic resin is formed on the particle surface of the vinyl chloride synthetic resin.

Thus obtained coloring high-molecular particulate material is favorably about 10 to about 200 μm more favorably about 30 to 100 μm in average particle diameter.

The individual coloring high-molecular particulate material in particle diameter of up to about 10 μm when mixed with the particles of different color, can not be identified individually with unaided eye, that is, the particles of different colors all mixed together throughly can not be visually seen as a colorful pattern.

On the other hand, the particle diameter of at least about 200 μm gives the particles the rough distribution of color without developing colorful effect of textiles or suede excellent in the descorative properties as well as the gritty texture failing to provide smoothness.

The particle diameter of about 30 to about 100 μm affords the particles with a smooth touch exhibiting outstanding textile-or suede-like texture.

Furthermore, to the coloring high-molecular particulate material, plasticizers or stabilizers can be added to obtain a molded form by the conventional fabrication such as extrusion and injection molding, etc.

The coating composition comprising the coloring high-molecular particulate material as an essential ingredient will be described hereafter.

The aforementioned dispersions of the coloring high-molecular particulate material is mixed as it is or after remove of the material with an aqueous varnish and an antiforming agent or a thickner is added when required to obtain the coating composition.

Examples of the preferable aqueous varnish are emulsion resins or water-soluble resins such as acrylic, vinyl acetate and like other aqueous varnish without any specific limitation.

It is possible to obtain the coating composition with various textures by varying degree of hardness or flexibility of the aqueous varnish or the coloring high-molecular particulate material.

It is also possible to obtain the colorful design finish coating composition by introducing the suitably combined coloring high-molecular particulate material of some different colors into the aqueous varnish.

EFFECT OF THE INVENTION

According to the present invention, the coloring high-molecular particulate material characterized in that a mixture of dispersed and stabilized coloring pigments and an emulsion resin are admixed with the particles of a vinyl chloride synthetic resin containing a plasticizer of about 4.7 to about 50 wt. %, wherein a metal salt is introduced to obtain coloring high-molecular particulate material of about 10 to about 200 μm in average particle diameter has the advantages given below.

The coloring particles mixed with different coloring particles on the particle surface of the vinyl chloride synthetic resin are identifiable with unaided eye giving the tiny dots of the coloring particles aligned on the coating film surface excellent in the decorative properties of the textile- or suede- like colorful designs.

Since the coloring particle has a resin particle of uniformly fixed size serving as a nucleolus, the particle size distribution is restricted free from uneven distribution of patterns.

Moreover, the resin particle cured beforehand serving as a nucleolus of the coloring pigments affords high fastness properties to the coating film.

Furthermore, the emulsion resin containing color pigments effectively coats the particle surface of the vinyl chloride synthetic resin by virtue of the plasticizer present therein.

The molded form and the coating composition comprising the coloring high-molecular particulate material can be used for delusterd colorful design finish, for example, the former is used for interior automotive seats, wall papers, etc. and the latter is applicable to walls, appliances, electronic equipments, furniture, display, etc.

The invention will be described in more detail with reference to the following examples, comparative examples and test examples.

EXAMPLE 1

A 80 parts by weight portion of styrene-acryl emulsion with 47% of non volatile content (brand name "Acronal YJ1210D", product of Mitsubishi Yuka Badische Co., Ltd.) serving as the emulsion resin was mixed with 40 parts by weight of titanium dioxide as the coloring pigment.

Consequently, to the vinyl chloride polymer with the particles in an average particle diameter of about 40 μm (brand name "Geon 103Z XA", product of the Japanese Geon Co., Ltd.) serving as the vinyl chloride synthetic resin, di-n-octyl phthalate as the plasticizer was added to a content of 29 wt. % preparing 150 parts by weight of the mixture in total.

The emulsion resin having the coloring pigment and the vinyl chloride synthetic resin having the plasticizer were combined with the further addition of suitable amount of water, wherein 1.1 parts by weight of calcium chloride as the metal salt was introduced to prepare the dispersions of the coloring high-molecular particulate material in an average particle diameter of 42 μm.

COMPARATIVE EXAMPLES 1 and 2

The dispersions of the coloring high-molecular particulate material with 42 μm in an average particle diameter (comparative example 1), same with 43 μm in an average particle diameter (comparative example 2) and same with 48 μm in an average particle diameter were respectively prepared in the same manner as in example 1 except di-n-octyl phthalate serving as the plasticizer was mixed in an amount of 0% (comparative example 1), 3.9% (comparative example 2) and 52% (comparative example 3) based on the combined amount of the resins.

EXAMPLE 2

The dispersions of the coloring high-molecular particulate material of 45 μm in an average diameter was prepared in the same manner as in example 1 with the exception of using aluminum sulfate as the metal salt.

EXAMPLE 3

A 80 parts by weight portion of acrylic emulsion with 50% of nonvolatile content (brand name "Nicazol RX 876", product of Nippon Carbide Industries Co., Ltd.) serving as the emulsion resin was mixed with 40 parts by weight of titanium dioxide as the coloring pigments.

Consequently, to the vinyl chloride polymer with the particles in an average particle diameter of about 130 μm (brand name "Sumilit SX-D", product of Sumitomo Chemical Co., Ltd.) serving as the vinyl chloride synthetic resin, dibutyl phthalate as the plasticizer was added to a content of 38 wt. % preparing 400 parts by eight of the mixture in total.

The emulsion resin having the coloring pigment and the vinyl chloride synthetic resin having the plasticizer were combined with the further addition of suitable amount of water, wherein 0.6 part by weight of calcium chloride as the metal salt was introduced to prepare the dispersions of the coloring high-molecular particulate material in an average particle diameter of 145 μm.

EXAMPLE 4

A 80 parts by weight portion of acrylic emulsion with about 50% of nonvolatile content (brand name "Nicazol RX 876", product of Nippon Carbide Industries Co., Ltd.) serving as the emulsion resin was mixed with 40 parts by weight of titanium dioxide as a coloring pigment.

Consequently, to vinyl-chloride the vinyl-acetate copolymer with the particles in an average particle diameter of about 100 μm (brand name "Denka Vinyl MM-90", product of the Electro Chemical Industrial Co., Ltd.) serving as the vinyl chloride synthetic resin, do-n-octyl phthalate as the plasticizer was added to a content of 33 wt. % preparing 76 parts by weight of the mixture in total.

The emulsion resin having the coloring pigment and the vinyl chloride synthetic resin having the plasticizer were combined with the further addition of suitable amount of water, wherein 1, 2 parts by weight of calcium chloride as the metal salt was introduced to prepare the dispersions of the coloring high-molecular particulate material in an average particle diameter of 115 μm.

COMPARATIVE EXAMPLES 4 and 5

The dispersions of the coloring high-molecular particulate material with 115 μm in an average particle diameter was prepared in the same manner as in example 4, except the amount of the vinyl chloride synthetic resin comprising the plasticizer to be mixed was 1000 parts by weight (comparative example 4) and 15 parts be weight (comparative example 5).

EXAMPLE 5

A 80 parts by weight portion of styrene-acryl emulsion with 47% of nonvolatile content (Brand name "Acronal YJ 1210D", product of Mitsubishi Yuka Badische Co., Ltd.) serving as the emulsion resin was mixed with 40 parts by weight of titanium dioxide as the coloring pigment.

Consequently, to the ethylene-vinyl chloride copolymer of about 150 μm (brand name "Rheulon E-1050", product of Toso Inc.) serving as the vinyl chloride synthetic resin, di -n- octyl phthalate as the plasticizer was added to a content of 9.1 wt. % preparing 75 parts by weight of the mixture in total.

The emulsion resin having the coloring pigment ant the vinyl vinyl chloride synthetic resin having the plasticizer were combined with the further addition of suitable amount of water, wherein 0.37 parts by weight of calcium chloride as the metal salt was introduced to prepare the dispersions of the coloring high-molecular particulate material in an average particle diameter of 155 μm.

EXAMPLE 6

A 80 parts by weight portion of a vinyl-chloride vinyl-acetate emulsion with about 43% of nonvolatile content (brand name "Vinybran 601", product of Nisshin Chemical) serving as the emulsion resin was mixed with 40 parts by weight of titanium dioxide as the coloring pigment.

Consequently, to the vinyl chloride polymer with the particles in an average particle diameter of about 40 μm (brand name "Geon 103 ZXA", product of The Japanese Geon Co., Ltd.) serving as the vinyl chloride synthetic resin, di-n-isodecyl adipate as the plasticizer was added to a content of 29 wt. % preparing 172 parts by weight of the mixture in total.

The emulsion resin having the coloring pigment and the vinyl chloride synthetic resin having the plasticizer were combined with the further addition of suitable amount of water, wherein 0.34 parts by weight of aluminum sulfate as the metal salt was introduced to prepare the dispersions of the coloring high-molecular particulate material in an average particle diameter of 45 μm.

COMPARATIVE EXAMPLE 6

A 80 parts weight portion of styrene-acryl emulsion (brand name "Acronal YJ 1210D", product of Mitsubishi Yuka Badische Co., Ltd.) serving as the emulsion resin was mixed with 40 parts by weight of titanium dioxide as the coloring pigment.

Consequently, to the vinyl chloride polymer with the particles in an average particle diameter of about 1 μm (brand name "Geon 121", product of The Japanese Geon Co., Ltd.) serving as the vinyl chloride synthetic resin, di-n-octyl phthalate as the plasticizer was added to a content of 29 wt. % preparing 150 parts by weight of the mixture in total.

The emulsion resin having the coloring pigment and the vinyl chloride synthetic resin having the plasticizer were combined with the further addition of suitable amount of water, wherein 1.1 parts by weight of calcium chloride as the metal salt was introduced to prepare the dispersions of the coloring high-molecular particulate material in an average particle diameter of 2 μm.

COMPARATIVE EXAMPLE 7

The dispersions of the coloring high-molecular particulate material in an average particle diameter of 250 μm was prepared in the same manner as in example 6 with the exception of using a vinyl chloride vinyl-acetate copolymer having the particles in an average particle daimeter of 220 μm (brand name "Graphtomer", product of The Japanese Geon Co., Ltd.) serving as the vinyl chloride synthetic resin.

TEST

A 50 parts by weight portion of the white coloring high-molecular particulate material removed from the dispersions prepared in each example and comparative example was respectively mixed with the black coloring high-molecular particulate material removed from the dispersions each prepared in same manner as in each example and comparative example, except 4.4 parts by weight of carbon black was mixed in stead of the pigment used earlier.

Each mixture obtained was thereafter blended with 50 parts by weight of the aqueous varnish in a nonvolatile content of 55% to obtain the coating composition.

Each coating composition was applied to the surface of a slate in the wet-on-wet coating to be examined appearance and texture of the coating film.

The appearance was observed in terms of visibility 2 hours after application with unaided eye.

In evaluating the coating composition, twenty panelists selected indiscriminately graded the composition at one by one point from the best score of 10 to the worst of 0. Table 1 shows the average point of each coating composition.

The coating composition was also checked through a microscope if it coated throughly the particles. In Table 1, ◯ shows the compositions coated the particles throughly and X shows the ones not so.

Furthermore, the coating composition was scratched by nails 30 days after the application to check the particle strength.

In Table 1, ◯ shows the compositions not peeled off and X shows the one peeled off.

TABLE 1

|  |  | Appearance | Texture | Coating | Strength |
| --- | --- | --- | --- | --- | --- |
| Example | 1 | 8.3 | 9.2 | ◯ | ◯ |
|  | 2 | 8.7 | 8.9 | ◯ | ◯ |
|  | 3 | 6.8 | 6.8 | ◯ | ◯ |
|  | 4 | 7.4 | 7.5 | ◯ | ◯ |
|  | 5 | 6.2 | 6.2 | ◯ | ◯ |
|  | 6 | 7.8 | 8.6 | ◯ | ◯ |
| Comparative | 1 | 1.2 | 4.8 | X | ◯ |
| Example | 2 | 2.1 | 5.3 | X | ◯ |
|  | 3 | 2.7 | 1.2 | ◯ | X |
|  | 4 | 2.4 | 4.8 | X | ◯ |
|  | 5 | 2.3 | 4.7 | ◯ | X |
|  | 6 | 1.6 | 7.0 | ◯ | ◯ |
|  | 7 | 3.5 | 2.3 | ◯ | ◯ |

The coating composition in example 1 to 6 exhibit the colorful effect of the sprinked pattern and the textile- and suede-like texture in smoothness and suitable roughness.

Of those compositions, the ones in examples 1 to 2 are especially outstanding.

The compositions in comparative examples 1, 2, 4 and 5 are, unlike the above compositions, exhibit uneven distribution of colors in appearance, especially the coating composition in comparative example 2 has the particles obviously not coated by the coloring pigments. The composition in comparative example 3 has high surface tackiness when touched and the composition in comparative example 6 only reveals a plain color visually failing to provide the appearance of the colorful design.

The coating composition in comparative example 7 has the rough color distribution in appearance different from the colorful effect of textiles and suede giving a disagreeable touch of too gritty.

It is presumed that the coloring high-molecular particulate material having the particles in an average particle diameter of about 10 to about 200 μm, preferably about 30 to about 100 μm, as well as the amount of the plasticizer to be added is about 4.7 to about 50 wt. %, preferably about 23 to about 44 wt. %, give excellent results in appearance and texture.

EXAMPLE 7

A 22.6 parts by weight portion of styrene-acryl emulsion with 50% of non volatile content (brand name "Nicazole RX 291" acid value 20, product of Nihon carbite Industry Co., Ltd.) serving as the polycarboric acid resin and a 52.6 parts by weight portion of "Nicazole RX 669" (brand name as same as the above, acid value 0, non volatile content 50% was mixed with 40 parts by weight of titanium dioxide as the coloring pigment.

Consequently, the vinyl chloride polymer as for the polymer particles in an average particle diameter of about 40 μm (brand name "Geon 103 ZXA", product of the Japanese Geon Co., Ltd.) is preparing 150 parts by weight.

The emulsion resin comprising of polycarboric acid resin (Acid value 6) and having the coloring pigment and the synthetic resin particles were combined with the further addition of suitable amount of water, wherein 1.1 parts by weight of calcium chloride as the metal salt was introduced to prepare the dispersions of the coloring high-molecular particulate material in an average particle diameter of 42 μm.

COMPARATIVE EXAMPLES 8 and 9

The dispersions of the coloring high-molecular particulate material with 42 μm in an average particle diameter (comparative example 8 ), same with 43 μm in an average particle diameter (comparative example 9) and same with 48 μm in an average particle diameter were respectively prepared in the same manner as in example 7, except acid value serving as the polycarboxylic acid resin was prepared in 4.0 (comparative example 8), 3.0 (comparative example 9).

EXAMPLE 8

The dispersions of the coloring high-molecular particulate material of 45 μm in an average diameter was prepared in the same manner as an example 7 with the exception of using aluminum sulfate as the metal salt.

TEST

A 50 parts by weight portion of the white coloring high-molecular particulate material removed from the dispersions prepared in each example and comparative example was respectively mixed with the black coloring high-molecular particulate material removed from the dispersions each prepared in the same manner in each example and comparative example, except 4.4 parts by weight of carbon black was mixed in stead of the pigment used earlier.

Each mixture obtained was thereafter blended with 50 parts by weight of the aqueous varnish in a nonvolatile content of 55% to obtain the coating composition.

Each coating composition was applied to the surface of a slate in the wet-on-wet coating to be examined appearance and texture of the coating film.

The appearance was observed in terms of visibility 2 hours after application with unaided eye.

In evaluating the coating composition, twenty panelists selected indiscriminately graded the composition at one by one point from the best score of 10 to the worst of 0. Table 2 shows the average point of each coating composition.

The coating composition was also checked through a microscope if it coated throughly the particles. In Table 2, ◯ shows the compositions coated the particles throughly and X shows the ones not so.

Furthermore, the coating composition was scratched by nails 30 days after the application to check the particle strength.

In Table 2, ◯ shows the compositions not peeled off and X shows the one peeled off.

TABLE 2

|  |  | Appearance | Texture | Coating | Strength |
| --- | --- | --- | --- | --- | --- |
| Example | 7 | 8.3 | 9.2 | ◯ | ◯ |
|  | 8 | 8.7 | 8.9 | ◯ | ◯ |
| Comparative | 8 | 1.2 | 4.8 | X | ◯ |
| Example | 9 | 2.1 | 5.3 | X | ◯ |

The coating composition in example 1 and 2 exhibit the colorful effect of the sprinkled pattern and the textile- and suede-like textile in smoothness and suitable roughness.

On the contrary, comparative example 1 and 2, especially comparative example had many uncolored particles, have the rought color distribution in appearance different from the colorful effect.

What we claimed are:

1. A dispersion of a colored high-molecular weight particulate material having an average particle diameter of 10-200 μm, said dispersion being prepared by a method comprising:
   a) mixing a pigment with an aqueous emulsion of a resin to form a dispersion of the pigment within the emulsion;
   b) combining the dispersion with particles of polyvinyl chloride having an average particle diameter of about 10 to 200 μm and containing a plasticizer in an amount of about 4.7 to 50 wt % based on the weight of the polyvinyl chloride to form a mixture; and
   c) adding at least one metal salt selected from the group consisting of calcium chloride, barium chloride, aluminum sulfate, cuprous sulfate, ferric chloride, silver nitrate and lead acetate to the mixture to cause the resin to coagulate onto to the particles of the polyvinyl chloride, whereby a film comprising the resin and the pigment is formed on the particles of the polyvinyl chloride.

2. A dispersion of a colored high-molecular weight particulate material having an average particle diameter of about 10-200 μm, said dispersion being prepared by a method comprising:
   a) mixing a pigment with a polycarboxylic acid resin having an acid value equal to or greater than 5 to form a dispersion of the pigment in the emulsion;
   b) combining the dispersion with particles of a polyvinyl chloride having an average particle diameter of about 10 to 200 μm and containing a plasticizer in an amount of about 4.7 to 50 wt % based on the weight of the vinyl chloride resin to form a mixture; and
   c) adding at least one metal salt selected from the group consisting of calcium chloride, barium chloride, aluminum sulfate, cuprous sulfate, ferric chloride, silver nitrate and lead acetate to the mixture to cause the resin to coagulate onto the particles of the polyvinyl chloride, whereby a film comprising the resin and the pigment is formed on the particles of the polyvinyl chloride.

* * * * *

UNITED STATES PATENT AND TRADEMARK OFFICE
CERTIFICATE OF CORRECTION

PATENT NO. : 5,106,889
DATED : April 21, 1992
INVENTOR(S) : Tadamitsu Hirata et al It is certified that error appears in the above-indentified patent and that said Letters Patent is hereby corrected as shown below:

On the cover page, after Item [22], the following should appear:

-- [30]   Foreign Application Priority Data

Jul. 29, 1988   [JP]   Japan   . . . . .   63-191955
   Oct. 31, 1988   [JP]   Japan   . . . .    63-275379 --.

Signed and Sealed this

Third Day of August, 1993

Attest:

MICHAEL K. KIRK

Attesting Officer         Acting Commissioner of Patents and Trademarks